US010732257B2

(12) United States Patent
Lee et al.

(10) Patent No.: US 10,732,257 B2
(45) Date of Patent: Aug. 4, 2020

(54) VEHICLE AND METHOD FOR CONTROLLING THE SAME

(71) Applicants:Hyundai Motor Company, Seoul (KR); Kia Motors Corporation, Seoul (KR); Gwangju Institute of Science and Technology, Gwangju (KR)

(72) Inventors: Jihye Lee, Gangwon-do (KR); Sinjung Kim, Gyeonggi-do (KR); Jongyoung Lee, Gyeonggi-do (KR); Daeyeon Kim, Gwangju (KR); Kangwook Kim, Gwangju (KR)

(73) Assignees: Hyundai Motor Company, Seoul (KR); Kia Motors Corporation, Seoul (KR); Gwangju Institute of Science and Technology, Gwangju (KR)

( * ) Notice: Subject to any disclaimer, the term of this patent is extended or adjusted under 35 U.S.C. 154(b) by 342 days.

(21) Appl. No.: 15/602,728

(22) Filed: May 23, 2017

(65) Prior Publication Data
US 2018/0188349 A1    Jul. 5, 2018

(30) Foreign Application Priority Data

Dec. 29, 2016 (KR) ........................ 10-2016-0181875

(51) Int. Cl.
*G01S 3/02* (2006.01)
*G01S 5/06* (2006.01)
*G01S 13/46* (2006.01)
*G01S 13/87* (2006.01)
(Continued)

(52) U.S. Cl.
CPC ................ *G01S 5/06* (2013.01); *G01S 13/46* (2013.01); *G01S 13/878* (2013.01); *B60N 2/002* (2013.01);
(Continued)

(58) Field of Classification Search
CPC ... G01S 5/06; G01S 5/14; G01S 13/46; G01S 13/878; G01S 19/31; G08B 13/1427; G07C 2209/06; G07C 2209/03; G07C 2209/64
(Continued)

(56) References Cited

U.S. PATENT DOCUMENTS 7,383,056 B2 * 6/2008 Matsubara .......... B60R 25/2009
340/426.13
7,429,922 B2 * 9/2008 Teshima ................ B60R 25/245
340/426.13
(Continued)

FOREIGN PATENT DOCUMENTS

JP    2015517948 A    6/2015
JP    2016038332 A    3/2016

*Primary Examiner* — Chuong P Nguyen
(74) *Attorney, Agent, or Firm* — Mintz Levin Cohn Ferris Glovsky and Popeo, P.C.; Peter F. Corless

(57) ABSTRACT

The vehicle includes: a plurality of vehicle antennas configured to receive a plurality of signals, respectively, from a remote control device; and a vehicle controller configured to: i) calculate an arrival distance between each of the plurality of vehicle antennas and the remote control device based on an arrival time of the plurality of signals received by the plurality of vehicle antennas, ii) extract an initial arrival pulse signal having a first reference value or higher from among at least one pulse signal contained in each of the plurality of signals, iii) extract at least one valid signal having a maximum value corresponding to a second reference value or higher from among the plurality of signals received by the plurality of vehicle antennas, iv) calculate an arrival distance of an initial arrival pulse signal contained in the at least one valid signal, and v) estimate a position of the remote control device based on the arrival distance.

17 Claims, 10 Drawing Sheets

(51) Int. Cl.
  *G01S 5/02* (2010.01)
  *B60N 2/00* (2006.01)
  *G01S 5/04* (2006.01)
  *G01S 5/14* (2006.01)

(52) U.S. Cl.
  CPC ............... *G01S 5/02* (2013.01); *G01S 5/0205* (2013.01); *G01S 5/04* (2013.01); *G01S 5/14* (2013.01); *G01S 2013/466* (2013.01)

(58) Field of Classification Search
  USPC ............ 342/451, 458, 463, 464, 357.71; 340/426.13, 426.17, 539.11, 539.22, 340/539.23
  See application file for complete search history.

(56) References Cited

U.S. PATENT DOCUMENTS

| | | | | |
|---|---|---|---|---|
| 8,044,770 B2* | 10/2011 | Nakajima | ............. | B60R 25/245 340/426.13 |
| 8,232,863 B2* | 7/2012 | Nakajima | ............. | B60R 25/245 340/5.61 |
| 8,659,388 B2* | 2/2014 | Biondo | ................. | G08C 17/02 340/426.1 |
| 9,437,064 B1* | 9/2016 | Ghabra | .............. | G07C 9/00658 |
| 9,682,684 B2* | 6/2017 | Miyazawa | ............. | B60R 25/245 |
| 9,747,736 B2* | 8/2017 | Austen | ................ | B60R 25/2018 |
| 9,783,161 B2* | 10/2017 | Lee | ......................... | B60R 25/24 |
| 9,894,492 B1* | 2/2018 | Elangovan | ........... | H01Q 1/3241 |
| 10,078,932 B2* | 9/2018 | Lee | .................... | G07C 9/00309 |
| 10,272,875 B2* | 4/2019 | Lee | ......................... | B60R 25/24 |
| 2007/0109093 A1* | 5/2007 | Matsubara | ......... | G07C 9/00309 340/5.61 |
| 2007/0162191 A1* | 7/2007 | Matsubara | ......... | G07C 9/00309 701/1 |
| 2012/0244877 A1* | 9/2012 | Margalef | ................ | H04Q 9/00 455/456.1 |
| 2013/0342379 A1 | 12/2013 | Bauman et al. | | |
| 2014/0253287 A1 | 9/2014 | Bauman et al. | | |
| 2016/0107611 A1 | 4/2016 | Siswick et al. | | |
| 2017/0217404 A1* | 8/2017 | Lee | ......................... | B60R 25/24 |
| 2018/0099643 A1* | 4/2018 | Golsch | .................... | B60R 25/24 |
| 2019/0355196 A1* | 11/2019 | Plattner | ............. | G07C 9/00309 |
| 2020/0017074 A1* | 1/2020 | Nakajima | ............. | H04B 1/034 |

* cited by examiner

<RX SIGNAL OF FIRST VEHICLE ANTENNA>

<RX SIGNAL OF SECOND VEHICLE ANTENNA>

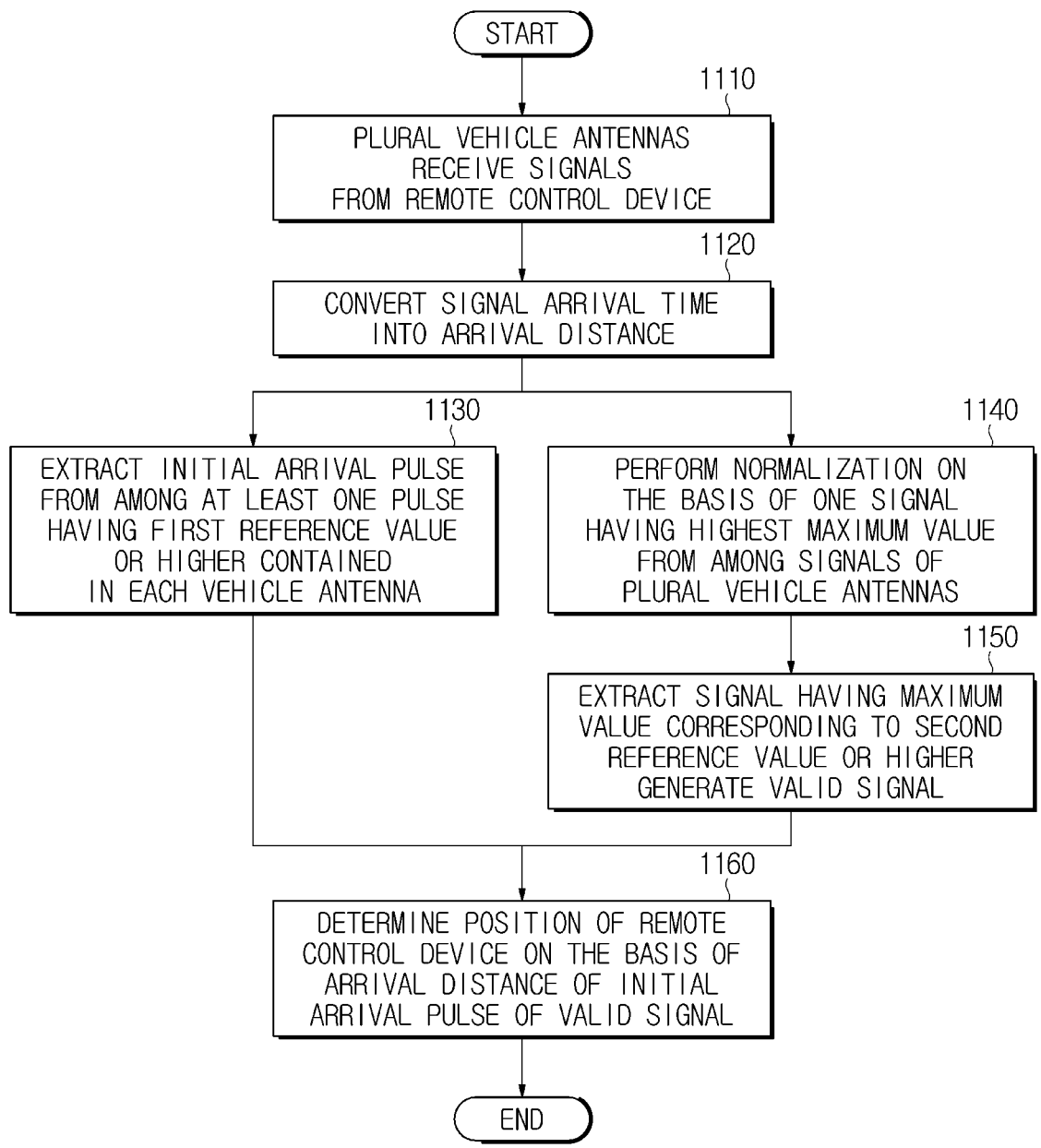

VEHICLE AND METHOD FOR CONTROLLING THE SAME

CROSS-REFERENCE TO RELATED APPLICATION

This application claims the benefit of priority to Korean Patent Application No. 10-2016-0181875, filed on Dec. 29, 2016 in the Korean Intellectual Property Office, the disclosure of which is incorporated herein by reference as if fully set forth herein.

BACKGROUND

1. Technical Field

Embodiments of the present disclosure relate generally to vehicular technologies and, more particularly, to a vehicle configured to sense a passenger and a method for controlling the same.

2. Description of the Related Art

A remote control device for a vehicle allows a driver who is located outside of the vehicle to control various functions of the vehicle, such as opening or closing doors of the vehicle, starting the vehicle, and the like. A smart card capable of being easily carried by the driver or a fob for wireless communication have been widely used as the remote control device.

The vehicle can estimate an approximate position of the remote control device based on a plurality of signals received from the device. In more detail, electromagnetic waves may propagate through the air at a constant propagation speed. The vehicle can measure each arrival distance of the plurality of signals transmitted from the remote control device using a predetermined time in which the signals arrive at one or more antennas of the vehicle in order to detect a reception (Rx) direction of each signal received through the antennas. Thus, the vehicle can measure a reception (Rx) angle of each signal. The vehicle may also estimate a relative position of the remote control device based not only on the arrival distances of the signals transmitted from the remote control device, but also reception (Rx) angles of the signals.

SUMMARY

It is an aspect of the present disclosure to provide a vehicle for correctly estimating the position of the remote control device based on signals collected by antennas of the vehicle, and a method for controlling the same.

Additional aspects of the disclosure will be set forth in part in the description which follows and, in part, will be apparent from the description, or may be learned by practice of the disclosure.

According to embodiments of the present disclosure, a vehicle includes: a plurality of vehicle antennas configured to receive a plurality of signals, respectively, from a remote control device; and a vehicle controller configured to: i) calculate an arrival distance between each of the plurality of vehicle antennas and the remote control device based on an arrival time of the plurality of signals received by the plurality of vehicle antennas, ii) extract an initial arrival pulse signal having a first reference value or higher from among at least one pulse signal contained in each of the plurality of signals, iii) extract at least one valid signal having a maximum value corresponding to a second reference value or higher from among the plurality of signals received by the plurality of vehicle antennas, iv) calculate an arrival distance of an initial arrival pulse signal contained in the at least one valid signal, and v) estimate a position of the remote control device based on the arrival distance.

The vehicle controller may normalize the plurality of signals received by the plurality of vehicle antennas based on a signal having a highest maximum value from among the plurality of signals received by the plurality of vehicle antennas.

The second reference value may equal a predetermined ratio multiplied by a signal having a highest maximum value from among the plurality of signals received by the plurality of vehicle antennas.

The vehicle controller may normalize the at least one pulse signal based on a pulse signal having a highest maximum value from among the at least one pulse signal contained in each of the plurality of signals.

The first reference value may equal a predetermined ratio multiplied by a pulse signal having a highest maximum value from among the at least one pulse signal contained in each of the plurality of signals.

The plurality of vehicle antennas may include at least three vehicle antennas, and the vehicle controller may estimate the position of the remote control device using triangulation.

The plurality of vehicle antennas may receive signals from the remote control device through an Ultra Wide Band (UWB) communication network.

When the plurality of signals includes at least three signals having a signal intensity greater than or equal to the first reference value and the second reference value, the vehicle controller may estimate the position of the remote control device based on an arrival distance of an initial arrival peak value of the at least one valid signal.

When the plurality of signals includes less than three signals having a signal intensity greater than or equal to the first reference value and the second reference value, the vehicle controller may estimate the position of the remote control device based on an arrival distance of an initial arrival pulse of a current valid signal newly received from the remote control device and an arrival distance of an initial arrival pulse of a next valid signal to be received from the remote control device.

The vehicle may further include a vehicle signal conversion module to demodulate the plurality of signals received from the remote control device, and transmit the demodulated signal to the vehicle controller.

Furthermore, according to embodiments of the present disclosure, a method for controlling a vehicle includes: receiving a plurality of signals by a plurality of vehicle antennas, respectively, from a remote control device; extracting an initial arrival pulse signal having a first reference value or higher from among at least one pulse signal contained in each of the plurality of signals; extracting at least one valid signal having a maximum value corresponding to a second reference value or higher from among the plurality of signals received by the plurality of vehicle antennas; calculating an arrival distance of an initial arrival pulse signal contained in the at least one valid signal; and estimating a position of the remote control device based on the arrival distance.

The extracting of the at least one valid signal may include: normalizing the plurality of signals received by the plurality of vehicle antennas based on a signal having a highest maximum value from among the plurality of signals received by the plurality of vehicle antennas; and extracting the at least one valid signal having the maximum value corresponding to the second reference value or higher from among the normalized signals.

The second reference value may equal a predetermined ratio multiplied by a signal having a highest maximum value from among the plurality of signals received by the plurality of vehicle antennas.

The extracting of the at least one valid signal may include: normalizing the at least one pulse signal based on a pulse signal having a highest maximum value from among the at least one pulse signal contained in each of the plurality of signals; and extracting the initial arrival pulse signal having the first reference value or higher from among the at least one normalized pulse signal.

The first reference value may equal a predetermined ratio multiplied by a pulse signal having a highest maximum value from among the at least one pulse signal contained in each of the plurality of signals.

The method may further include, before the extracting of the at least one valid signal, calculating an arrival distance from the remote control device to each of the plurality of vehicle antennas based on an arrival time of the plurality of signals received by the plurality of vehicle antennas.

The calculating of the arrival distance may include calculating an arrival distance based on an arrival time of an initial arrival peak value of the at least one valid signal.

The receiving of the plurality of signals may include receiving a signal from the remote control device through an Ultra Wide Band (UWB) communication network.

The estimating of the position of the remote control device may include, when the plurality of signals includes less than three signals having a signal intensity greater than or equal to the first reference value and the second reference value, estimating the position of the remote control device based on an arrival distance of an initial arrival peak value of a current valid signal newly received from the remote control device and an arrival distance of an initial arrival peak value of a next valid signal to be received from the remote control device.

The method may further include, before the extracting of the at least one valid signal, demodulating the plurality of signals received from the remote control device.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a flowchart illustrating a method for controlling the vehicle according to embodiments of the present disclosure.

DETAILED DESCRIPTION OF THE EMBODIMENTS

Figure 1:
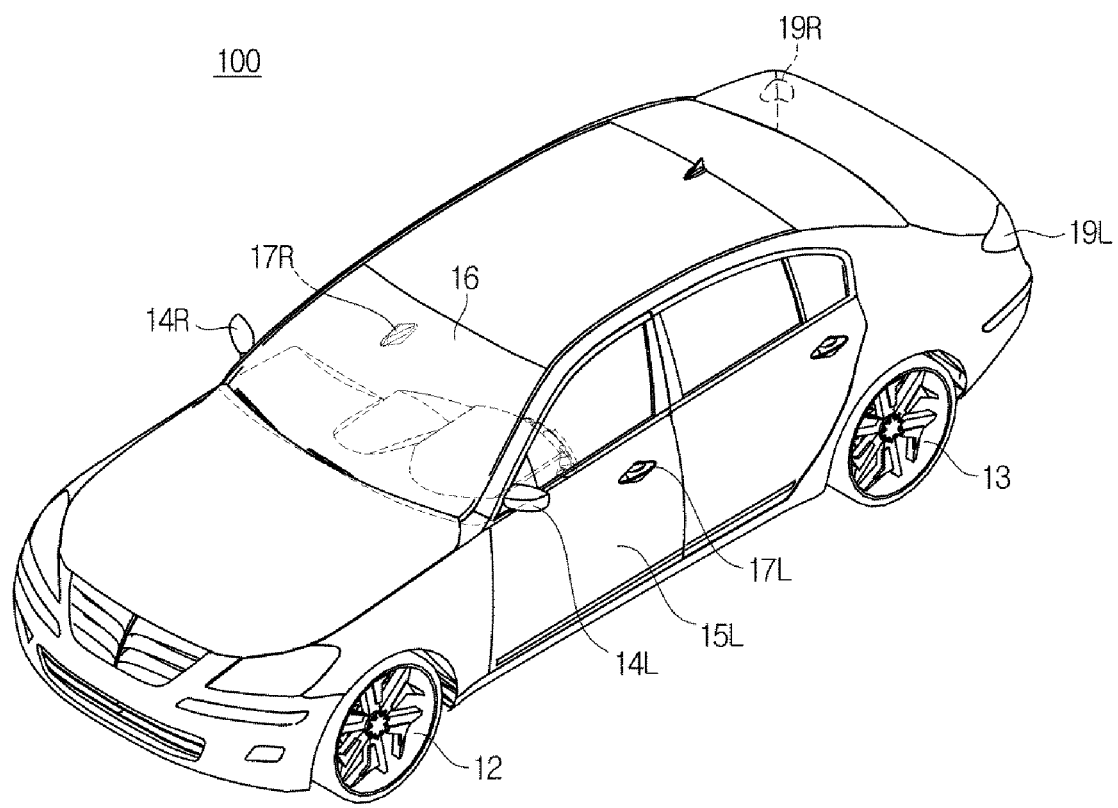
FIG. 1 is a perspective view illustrating the appearance of a vehicle according to embodiments of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, embodiments will now be described more fully hereinafter with reference to the accompanying drawings. The embodiments may, however, be embodied in many different forms and should not be construed as being limited to the embodiments set forth herein. These embodiments are provided so that this disclosure will be thorough and complete and will fully convey the embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Reference will now be made in detail to the embodiments of the present disclosure, examples of which are illustrated in the accompanying drawings, wherein like reference numerals refer to like elements throughout.

Figure 2:
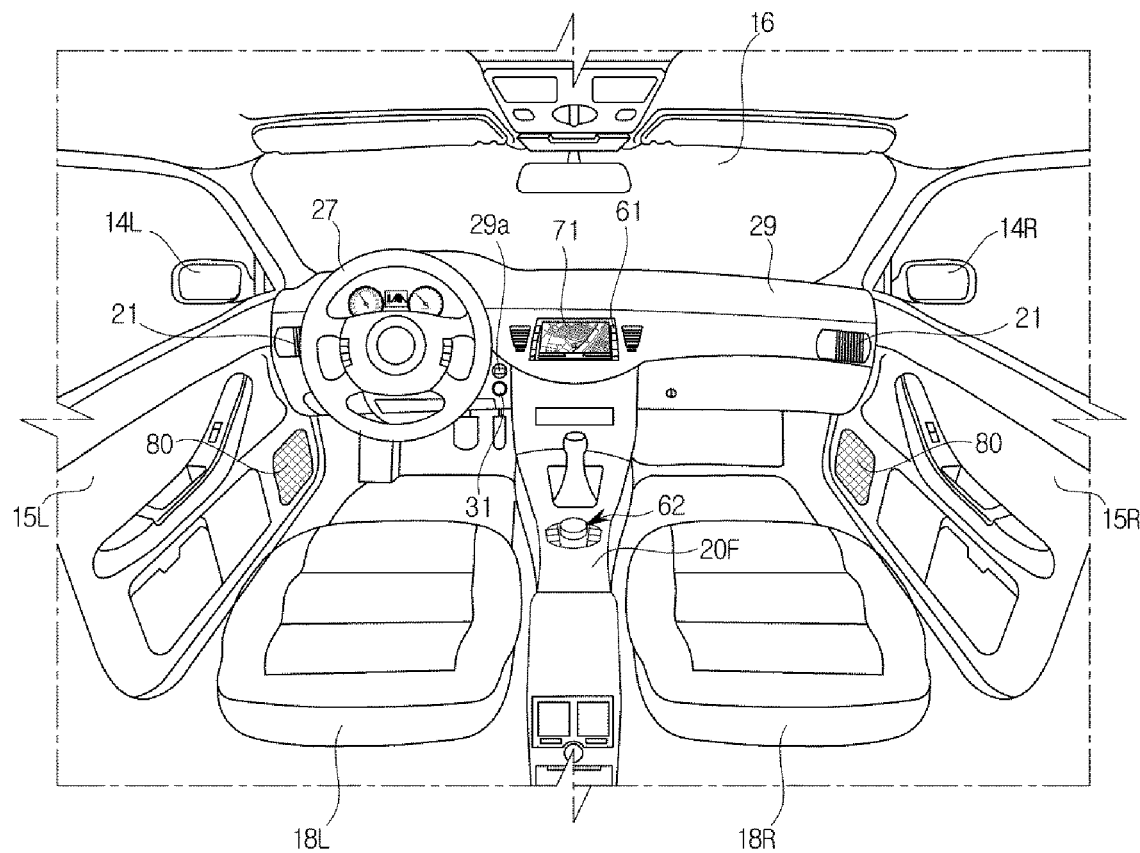
FIG. 2 is a view illustrating the internal structure of the vehicle according to embodiments of the present disclosure.

FIG. 1 is a perspective view illustrating the appearance of a vehicle according to embodiments of the present disclosure. FIG. 2 is a view illustrating the internal structure of the vehicle according to embodiments of the present disclosure.

As shown in FIG. 1, the appearance of the vehicle 100 according to embodiments of the present disclosure may include, for example, vehicle wheels 12 and 13 to transport the vehicle 100 from one particular location to another, doors 15L to shield an indoor space of the vehicle 100 from the outside, a vehicle windshield 16 to provide a forward view of the vehicle 100 to a vehicle driver who rides in the vehicle 100, and side-view mirrors 14L and 14R to provide a backward view of the vehicle 100 to the vehicle driver.

The wheels 12 and 13 may include front wheels 12 provided at the front of the vehicle and rear wheels 13 provided at the rear of the vehicle. A drive device (not shown) installed in the vehicle 100 may provide rotational force to the front wheels 12 or the rear wheels 13 in a manner that the vehicle 100 moves forward or backward. The drive device (not shown) may include an engine to generate rotational force by burning fossil fuels or a motor to generate rotational force upon receiving a power source from a condenser.

The doors 15L and 15R (see FIG. 2) are rotatably provided at the right and left sides of the vehicle 100 so that a vehicle driver can ride in the vehicle 100 when any of the doors 15L and 15R is open and an indoor space of the vehicle 100 can be shielded from the outside when the doors 15L and 15R are closed. In addition, knobs 17L and 17R to open or close the doors 15L and 15R may be provided at the outside of the vehicle 100, and vehicle antennas 111a and 111c (see FIG. 3) to transmit/receive radio frequency (RF) signals and a touch sensor (not shown) to recognize the user touch input may be mounted to the knob 17L.

If the touch sensor of the doors 15L and 15R detects the user touch input of the doors 15L and 15R under the condition that the user holds the remote control device 200 (see FIG. 3), the vehicle 100 may authenticate the remote control device 200 by transmitting and receiving RF signals to and from the remote control device 200. If authentication is completed, door lock of the vehicle 100 is released, and the door 15L may be opened by the user who pulls the knobs 17L and 17R. Here, the term "user" may be a person who holds the remote control device 200.

The vehicle 100 may automatically lock the doors 15L and 15R when the user gets out of the vehicle 100 and other passengers are not present in the vehicle 100, in consideration of the presence of the user and other passengers in the vehicle 100.

The windshield 16 is provided at a front upper portion of the vehicle 100 so that a vehicle driver who rides in the vehicle 100 can obtain visual information of a forward direction of the vehicle 100. The windshield 16 may also be referred to as a windshield glass.

The side-view mirrors 14L and 14R may include a left side-view mirror 14L provided at the left of the vehicle 100 and a right side-view mirror 14R provided at the right of the vehicle 100, so that the driver who rides in the vehicle 100 can obtain visual information of the lateral and rear directions of the vehicle 100.

In addition, the vehicle may further include back lights 19L and 19R configured to selectively irradiate light such that each of the back lights 19L and 19R can serve as a turn signal light, a brake light, or a backup light. Vehicle antennas 111e and 111f (see FIG. 3) for transmitting and receiving RF signals may be respectively mounted to the back lights 19L and 19R.

Besides, the vehicle 100 may include a variety of sensing devices, for example, a proximity sensor to detect the presence of obstacles located at the lateral and rear directions of the vehicle 100, a rain sensor to detect the presence or absence of rainfall and the amount of rainfall, etc.

It should be understood that the exterior of the vehicle 100 as shown in FIG. 1 and described above is provided for demonstration purposes only, and thus does not limit the scope of the present disclosure or claims.

As shown in FIG. 2, an Audio Video Navigation (AVN) display 71 and the AVN input part 61 may be mounted to the center region of a dashboard 29. The AVN display 71 may selectively display at least one of an audio screen image, a video screen image, and a navigation screen image. In addition, the AVN display 71 may display various control screen images related to the vehicle 100 or screen images related to additional functions.

The AVN display 71 may be implemented by any one of a Liquid Crystal Display (LCD), a Light Emitting Diode (LED), a Plasma Display Panel (PDP), an Organic Light Emitting Diode (OLED), a Cathode Ray Tube (CRT), etc.

The AVN input part 61 formed in a hard key shape may be mounted to one region adjacent to the AVN display 71. If the AVN display 71 is implemented as a touchscreen, the AVN display may also be implemented as a touch panel at the front surface of the AVN display 71.

A center input part 62 may be implemented as a jog-wheel located between the driver seat 18L and the passenger seat 18R, and may be located in the vicinity of a front-seat console box 20F. The user may input a control command by moving the center input part 62 forward or backward and to the left or right or by pressing or turning the center input part 62.

In addition, a vehicle antenna 111b (see FIG. 3) for transmitting and receiving RF signals to and from the remote control device 200 may further be mounted to the front-seat console box 20F disposed between the driver seat 18L and the passenger seat 18R, and a vehicle antenna 111d (not shown) may further be installed in a back-seat console box.

The vehicle 100 may include a sound output part 80 to output the acoustic or sound signal. The sound output part 80 may be implemented as a speaker. The sound output part 80 may output the acoustic or sound signal needed to perform the audio function, the video function, the navigation function, and other additional functions.

The steering wheel 27 may be mounted to the dashboard 29 located adjacent to the driver seat 18L, and a keyhole 29a in which the remote control device 200 (e.g., a key fob of FIG. 3) can be inserted may be formed close to the steering wheel 27. If the remote control device 200 is inserted into the keyhole 29a or if authentication between the remote control device 200 and the vehicle 100 is completed over a wireless communication network, the remote control device 200 and the vehicle 100 may communicate with each other.

In addition, the dashboard 29 may include a start button 31 to turn starting of the vehicle 200 on or off. The remote control device 200 may be inserted into the keyhole 29a. If authentication between the remote control device 200 and the vehicle 100 is completed over the wireless communication network, the vehicle 100 starts operation by the user who pushes the start button 31.

In the meantime, the vehicle 100 may include an air-conditioner configured to perform the heating and cooling function, and may control air temperature of the internal space of the vehicle 100 by discharging the heated or cooled air through an air outlet 21.

It should be understood that the interior of the vehicle 100 as shown in FIG. 2 and described above is provided for demonstration purposes only, and thus does not limit the scope of the present disclosure or claims.

Figure 3:
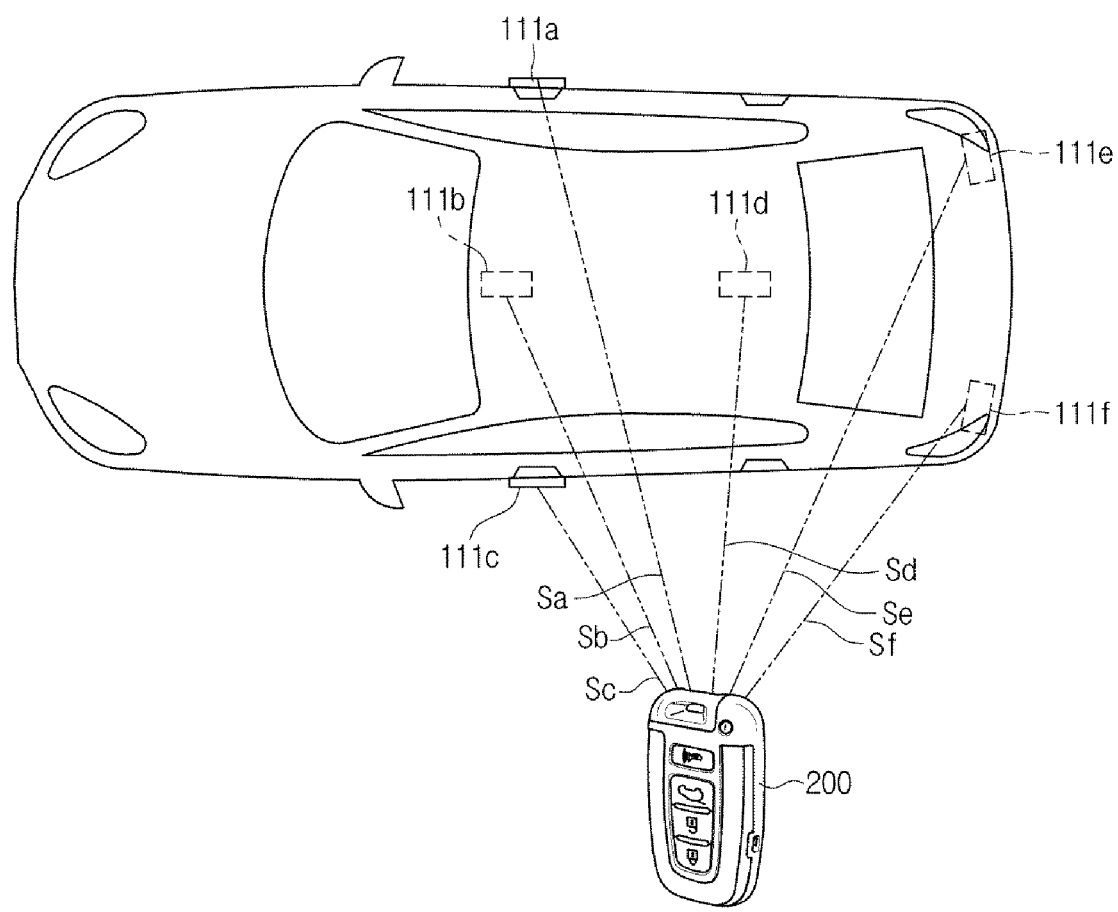
FIG. 3 is an exemplary view illustrating a method for transmitting and receiving radio frequency (RF) signals between a vehicle antenna and the remote control device according to embodiments of the present disclosure.

FIG. 3 is an exemplary view illustrating a method for transmitting and receiving RF signals between a vehicle antenna and the remote control device according to embodiments of the present disclosure.

For convenience of description, the embodiments of FIGS. 1 and 2 have been disclosed using knobs 17L and 17R, back lights 19L and 19R, and vehicle antennas 111a~111f mounted to the front-seat console box 20F and the back-seat console box as an example, the number of the vehicle antennas 111a~111f and the installation position thereof are not limited thereto.

As shown in FIG. 3, when the remote control device 200 transmits the plurality of signals Sa~Sf, the vehicle antennas 111a~111f may respectively receive the plurality of signals Sa~Sf from the remote control device 200. Although FIG. 3 illustrates only six signals Sa~Sf, the remote control device 200 can transmit many more signals, and signals Sa~Sf received by the vehicle antennas 111aa~111f are shown in FIG. 3.

The remote control device 200 may directly contact the vehicle 100 or may be connected to the vehicle 100 through transmission and reception of RF data signal (hereinafter referred to as a "data signal").

In the example illustrated in FIG. 3, the remote control device 200 may be implemented as a key fob, which is connected to the vehicle 100 such that the door lock can be released and the vehicle can start operation and travel. The remote control device 200 is not limited to a key fob, however, as described below.

The remote control device 200 illustrated in FIG. 3 may include not only the key fob, but also all kinds of input devices capable of releasing the door lock or controlling the vehicle 100 in a manner that the vehicle 100 can start operation or can start traveling. For example, if a mobile device (e.g., a smart phone, tablet, etc.) serves as the remote control device, the remote control device 200 may also include one or more mobile devices therein. In this case, a software application ("app") capable of performing the operations of the remote control device 200 may be installed in the mobile device. The app may be installed in the mobile device during the manufacturing process, and then introduced onto the market. After the mobile device including the app has been sold to consumers, the mobile device may download the app from the server according to a user request. In addition, an authentication procedure may be needed in a manner that the mobile device can operate as the remote control device 200 of the vehicle 100.

The remote control device 200 may be simultaneously sold to consumers along with the vehicle 100, and authentication information of the remote control device 200 may be pre-registered in the vehicle 100.

The remote control device 200 and the vehicle 100 may communicate with each other over an Ultra Wide Band (UWB) communication network, such that RF signals can be communicated between the remote control device 200 and the vehicle 100.

The UWB communication network generally has 100 Mbps speed or higher within a frequency band ranging from 3.1 GHz to 10.6 GHz, and may implement super-high speed communication at low power throughout a bandwidth larger than a conventional spectrum.

The vehicle 100 may measure the arrival times of the signals Sa~Sf respectively received by the vehicle antennas 111a~111f. Since electromagnetic waves propagate through the air at a constant speed, the arrival distance between each of the vehicle antennas 111a~111f and the remote control device 200 may be measured on the basis of the respective arrival times. The vehicle 100 may measure reception (Rx) angles of the respective signals Sa~Sf by detecting the reception (Rx) directions of the signals Sa~Sf received through the respective vehicle antennas 111a~111f. A relatively position of the remote control device may be estimated using triangulation (e.g., time of arrival (TOA) or time difference of arrival (TDOA)).

Figure 4:
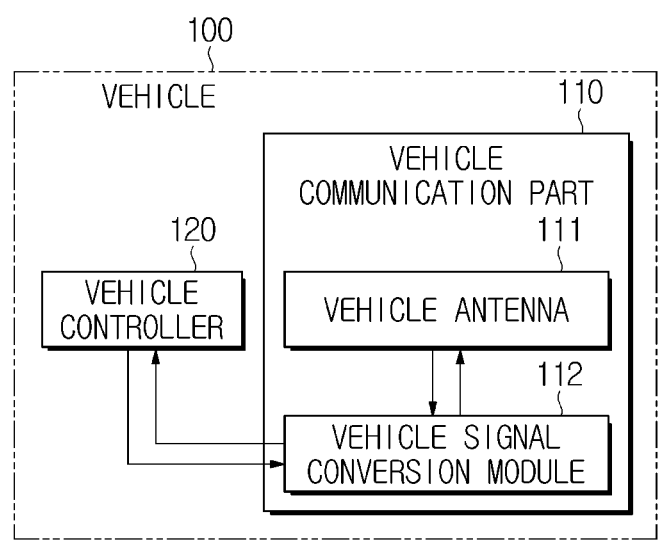
FIG. 4 is a control block diagram illustrating the vehicle according to embodiments of the present disclosure.

FIG. 4 is a control block diagram illustrating the vehicle according embodiments of the present disclosure.

As shown in FIG. 4, the vehicle 100 may include a vehicle communication part 110 and a vehicle controller 120.

The vehicle communication part 110 may include a vehicle antenna 111 to transmit and receive RF signals and a vehicle signal conversion module 112. The vehicle signal conversion module 112 may modulate a digital signal generated from the vehicle controller 120 into an analog RF signal, or may demodulate the analog RF signal received by the vehicle antenna 111 into the digital signal.

If the vehicle antenna 111 transmits and receives RF signals within a UWB frequency band, the vehicle antenna 111 may transmit and receive a pulse signal, and the pulse signal transmitted and received through the vehicle antenna 111 may include a plurality of pulses having a short wavelength.

As can be seen in FIG. 3, the vehicle antenna 111 may include a plurality of vehicle antennas 111a~111f.

The vehicle signal conversion module 112 may modulate data to be transmitted to the remote control device 200 into a signal of a frequency band appropriate for the UWB communication network on the basis of a control signal of the vehicle controller 120, may generate an RF signal, may allow the generated RF signal to be transmitted to the remote control device 200 through the vehicle antenna 111, may demodulate the RF signal received by the vehicle antenna 111 into a signal capable of being read by the vehicle controller 120, and may transmit the demodulated signal to the vehicle controller 120.

In this case, the vehicle signal conversion module 112 may filter the RF signal received through the vehicle antenna 111. For example, the vehicle signal conversion module 112 may further include a band pass filter (BPF) to extract a UWB frequency band signal. The RF signal having passed through the BPF may be converted into an RF signal having a high signal-to-noise ratio (SNR) after passing through a matched filter, and the converted RF signal may be applied to the vehicle controller 120.

The vehicle controller 120 may generate a control signal for controlling individual constituent elements of the vehicle 100, and may perform different control processes according to the respective control modes. The vehicle controller 120 may generate a control signal for controlling the vehicle communication part 110.

In more detail, the vehicle controller 120 may control the vehicle signal conversion module 112 such that the vehicle signal conversion module 112 can generate RF signals by modulating data to be transmitted to the remote control device 200. For example, data to be transmitted to the remote control device 200 may be a signal for requesting authentication information needed when the vehicle 100 authenticates the remote control device 200.

In addition, the vehicle controller 120 may control the vehicle antenna 111 to receive RF signals. In this case, the vehicle controller 120 may authenticate the remote control device 200 on the basis of authentication information contained in the RF signal, or may estimate the position of the remote control device 200 on the basis of the RF signal. A method for estimating the position of the remote control device 200 on the basis of the RF signal will hereinafter be described in detail.

The vehicle controller 120 may be implemented as a memory (not shown) to store an algorithm for controlling the constituent elements of the vehicle 100 or data of a program related to the algorithm, or may be implemented as a processor (not shown) for performing the above-mentioned operation using data stored in the memory. In this case, the memory and the processor may be implemented as different chips. Alternatively, the memory and the processor may also be implemented as a single chip as necessary.

At least one constituent element may be added or deleted in response to performance of individual constituent elements of the vehicle 100 shown in FIG. 4. In addition, it is well known to those skilled in the art that mutual positions of the constituent elements can be changed in response to performance or structure of the system without departing from the scope or spirit of the present disclosure.

Meanwhile, some constituent elements shown in FIG. 4 may be a software constituent element and/or a hardware constituent element such as Field Programmable Gate Array (FPGA) or Application Specific Integrated Circuit (ASIC).

A method for controlling the vehicle controller 120 to recognize the position of the remote control device 200 on the basis of the RF signal received by the remote control device 200 will hereinafter be described with reference to FIGS. 5 and 6.

Figure 5A:
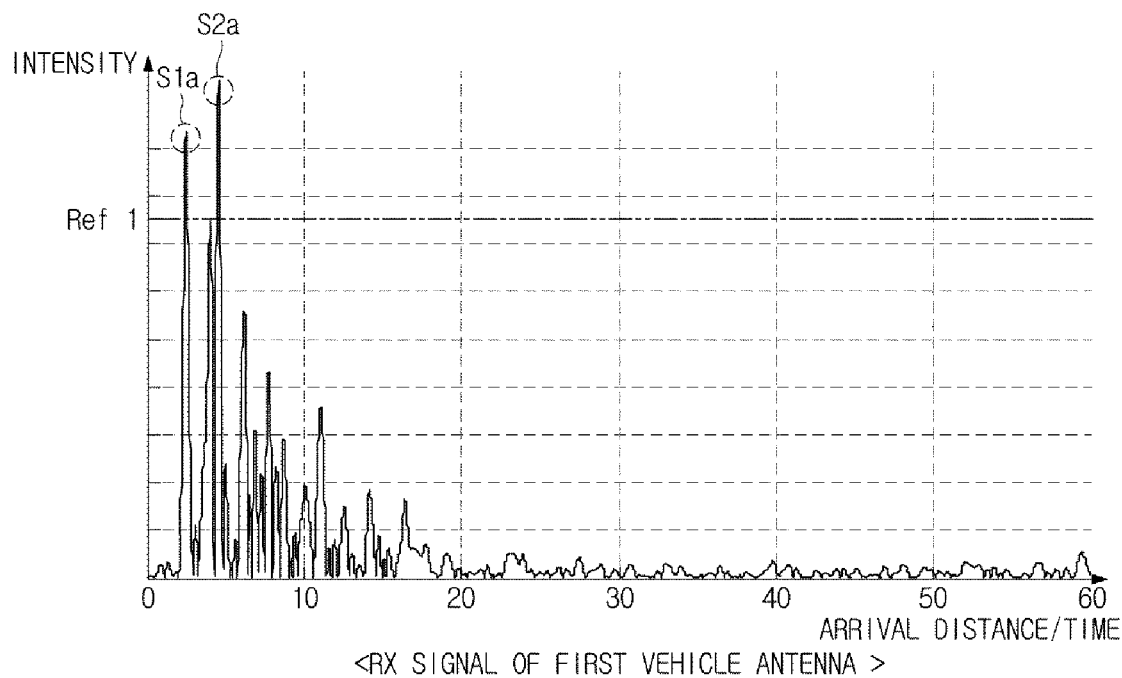
FIGS. 5A and 5B respectively illustrate waveforms of the plurality of RF signals received from the remote control device.
Figure 5A:
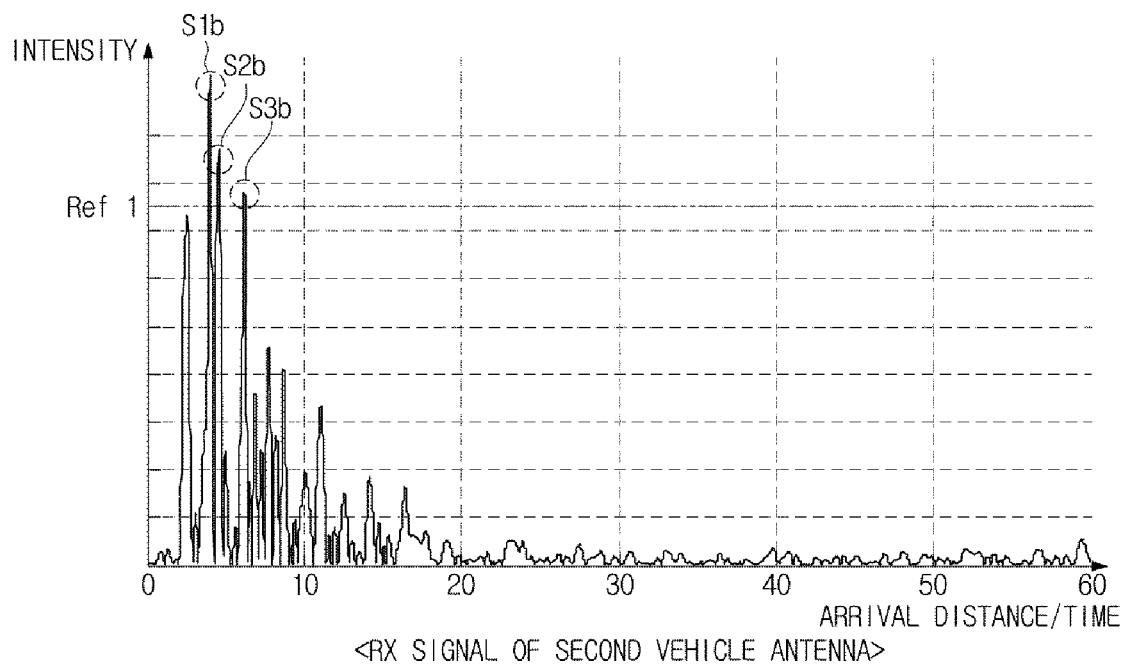
Figure 5B:
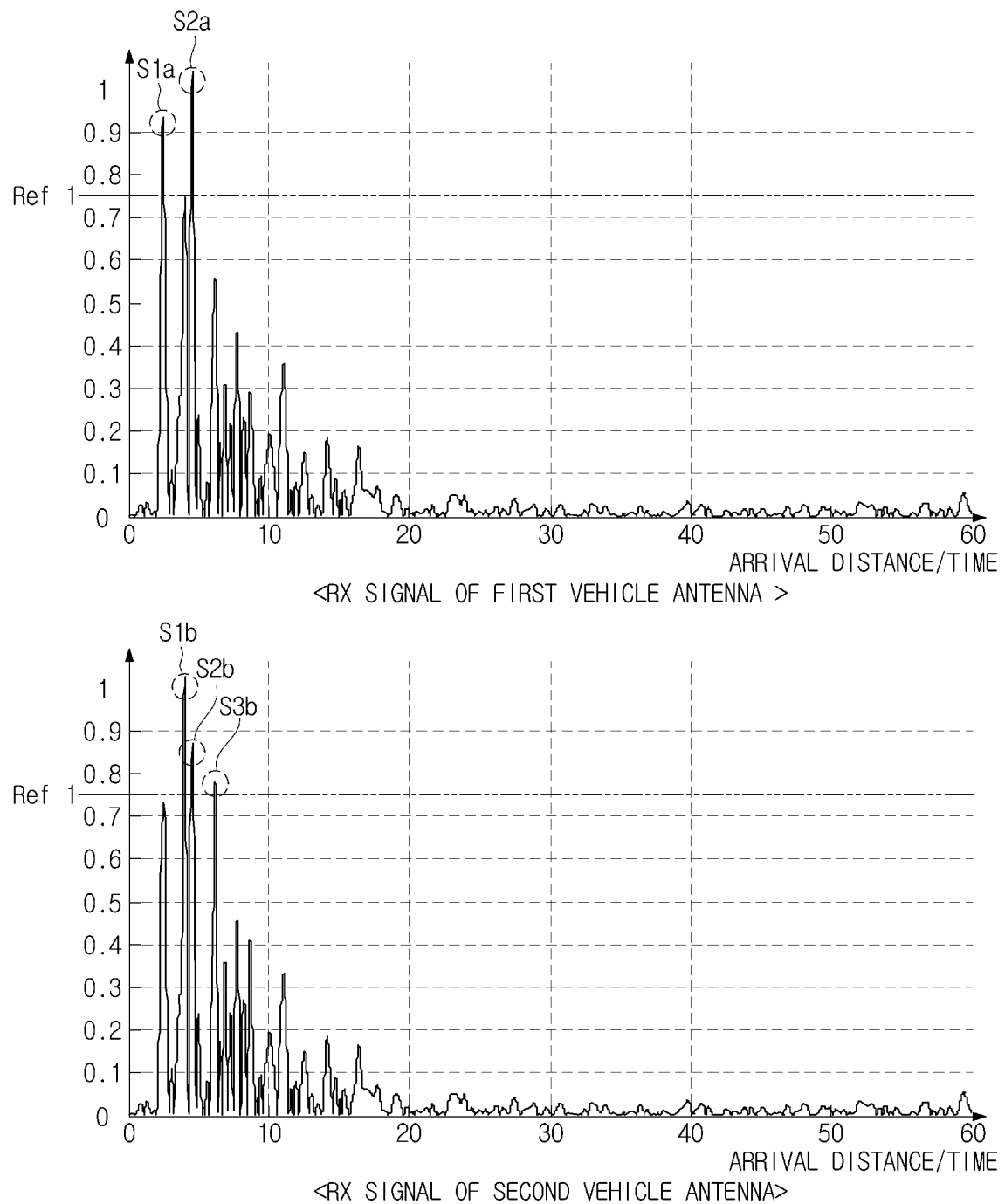

FIGS. 5A and 5B respectively illustrate waveforms of the plurality of RF signals received from the remote control device. As can be seen from FIGS. 5A and 5B, waveforms of the plurality of RF signals are shown on a single graph. For convenience of description, the RF signal received by the first vehicle antenna 111a may be referred to as a first RF signal Sa, the RF signal received by the second vehicle antenna 111b may be referred to as a second RF signal Sb, the RF signal received by the third vehicle antenna 111c may be referred to as a third RF signal Sc, the RF signal received by the fourth vehicle antenna 111d may be referred to as a fourth RF signal Sd, the RF signal received by the fifth vehicle antenna 111e may be referred to as a fifth RF signal Se, and the RF signal received by the sixth vehicle antenna 111f may be referred to as a sixth RF signal Sf.

Referring first to FIG. 5A, although the remote control device 200 simultaneously transmits the first to sixth RF signals Sa~Sf, because the RF signals collide with various kinds of objects and are reflected from the objects, the first to sixth RF signals Sa~Sf arrived at any one of the vehicle antennas 111a~111f may include a plurality of pulse signals having different arrival times and different intensities.

The vehicle controller 120 may extract a pulse signal having a first reference value Ref1 or higher from among the plurality of pulse signals received by any one of the vehicle antennas 111a~111f, and may extract an initial arrival pulse signal having the shortest arrival time (i.e., the shortest arrival distance) from among the plurality of pulse signals, each of which has the first reference value Ref1 or higher.

The above-mentioned operation is based on rectilinear propagation characteristics. In more detail, assuming that an initial arrival pulse signal from among the plurality of pulse signals has actual distance information, the above-mentioned operation can calculate distance information using the initial arrival pulse signal.

Referring again to FIG. 5A, the vehicle controller 120 may extract pulse signals S1a and S2a, each of which has a first reference value Ref1 or higher, from among the plurality of pulse signals (S1a, S2a . . . ) received by the first vehicle antenna 111a, and may extract the pulse signal S1a having the shortest arrival time from among the pulse signals S1a and S2a, each of which has the first reference value Ref1 or higher, as the initial arrival pulse signal.

Referring next to FIG. 5B, the vehicle controller 120 according to another embodiment may normalize other pulse signals (S1a, S2a . . . ) on the basis of one pulse signal S2a having the highest maximum value from among the plurality of pulse signals (S1a, S2a . . . ) received by the first vehicle antenna 111a. For example, the vehicle controller 120 may set a maximum value of the pulse signal S2a having the highest maximum value from among the plurality of pulse signals (S1a, S2a . . . ) to '1', and may define other pulse signals (S1a, S2a . . . ) according to the ratio of the pulse signal S2a having the highest maximum value.

The vehicle controller 120 may extract the pulse signal S1a having the shortest arrival time from among the pulse signals S1a and S2a, each of which has a maximum value corresponding to the first reference value Ref1 or higher, as the initial arrival pulse signal. In this case, the vehicle controller 120 may set a specific value, that is obtained when a predetermined ratio (e.g., 0.75 of FIG. 5B) is multiplied by the pulse signal S2a having the highest maximum value from among the plurality of pulse signals (S1a, S2a . . . ), to the first reference value Ref1.

Referring once again to FIG. 5A, the vehicle controller 120 may extract pulse signals S1b, S2b, and S3b, each of which has the first reference value Ref1 or higher, from among the plurality of pulse signals received by the second vehicle antenna 111b, and may extract one pulse signal S1b having the shortest arrival time from among the pulse signals S1b, S2b, and S3b, each of which has the first reference value Ref1 or higher.

In the same manner as in the first vehicle antenna 111a, as can be seen in FIG. 5B, the vehicle controller 120 according to embodiments may normalize other pulse signals (S1b, S2b, S3b . . . ) on the basis of one pulse signal S1b having the highest maximum value from among the plurality of pulse signals (S1b, S2b, S3b . . . ) received by the second vehicle antenna 111b. For example, the vehicle controller 120 may set a maximum value of the pulse signal S1b having the highest maximum value from among the plurality of pulse signals (S1b, S2b, S3b . . . ) to '1', and may define other pulse signals (S1$b$, S2$b$, S3$b$ . . . ) according to the ratio of the pulse signal S1$b$ having the highest maximum value.

The vehicle controller 120 may extract the pulse signal S1$b$ having the shortest arrival time from among the pulse signals S1$b$, S2$b$, and S3$b$, each of which has a maximum value corresponding to the first reference value Ref1 or higher, as the initial arrival pulse signal. In this case, the vehicle controller 120 may set a specific value, that is obtained when a predetermined ratio (e.g., 0.75 of FIG. 5B) is multiplied by the pulse signal S1$b$ having the highest maximum value from among the plurality of pulse signals (S1$b$, S2$b$, S3$b$ . . . ), to the first reference value Ref1.

In association with the third to sixth vehicle antennas 111$c$~111$f$, the vehicle controller 120 may also extract the initial arrival pulse signals S1$c$, S1$d$, S1$e$, and S1$f$ in the same manner as in the embodiments of FIGS. 5A and 5B.

In the meantime, the vehicle controller 120 may extract the initial arrival pulse signal for each vehicle antenna 111$a$~111$f$, and may also extract at least one RF signal having a maximum value corresponding to the second reference value or higher from among the RF signals received by the plurality of vehicle antennas 111$a$~111$f$, as a valid signal.

Figure 6A:
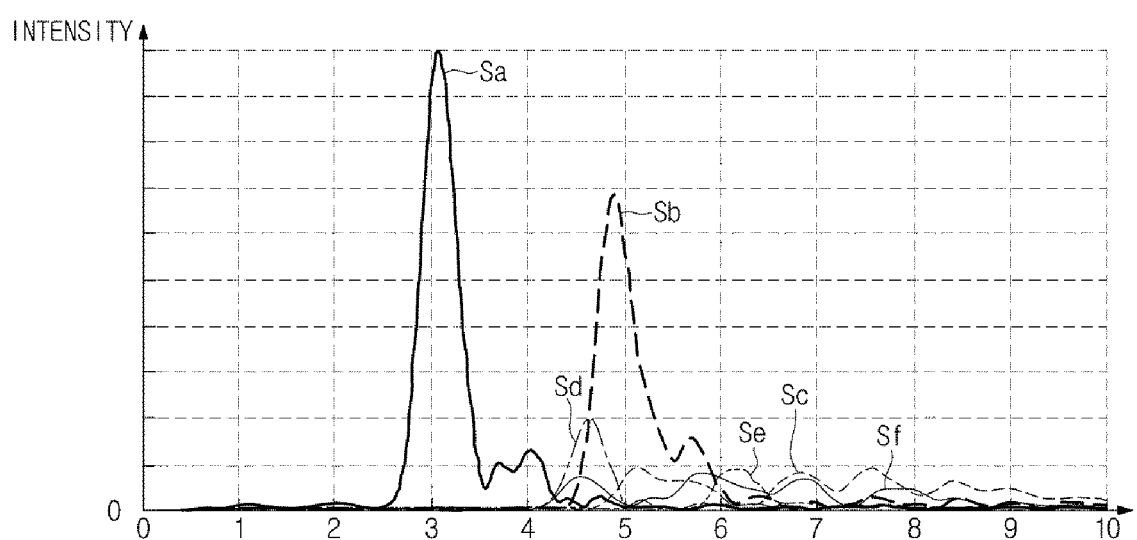
FIGS. 6A to 6C illustrate waveforms of the plurality of RF signals.
Figure 6B:
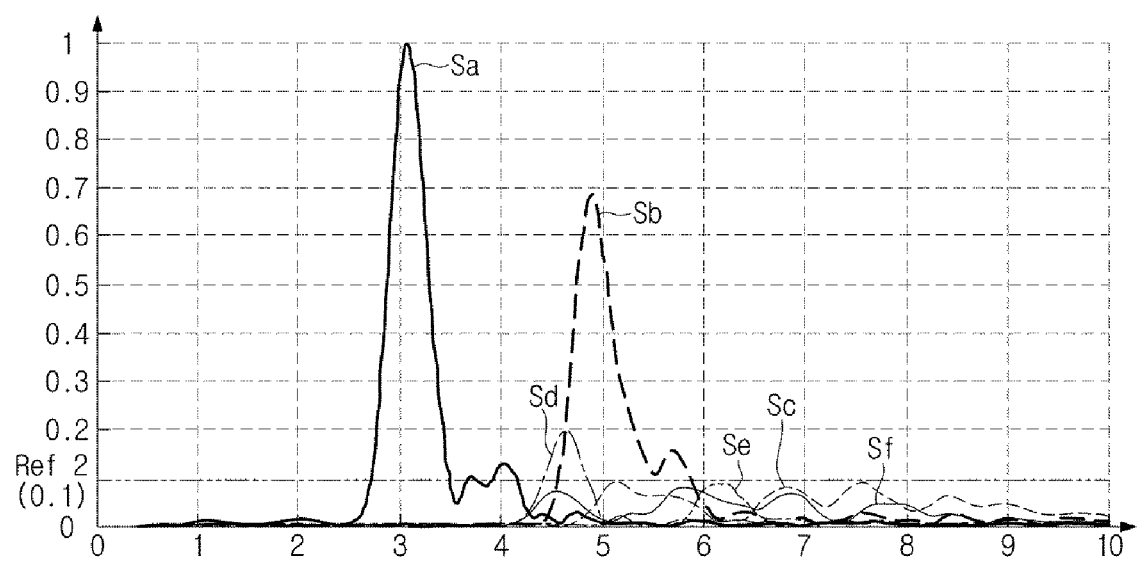

In more detail, as can be seen in FIG. 6A, the vehicle controller 120 may collect RF signals Sa~Sf received by the plurality of vehicle antennas 111$a$~111$f$. As can be seen in FIG. 6B, the vehicle controller 120 may normalize other RF signals Sb~Sf on the basis of the RF signal Sa having the highest maximum value from among the RF signals Sa~Sf. For example, the vehicle controller 120 may set a maximum value of the RF signal Sa having the highest maximum value from among the RF signals Sa~Sf to "1", and may define other RF signals Sb~Sf according to the ratio of the RF signal Sa having the highest maximum value.

Figure 6C:
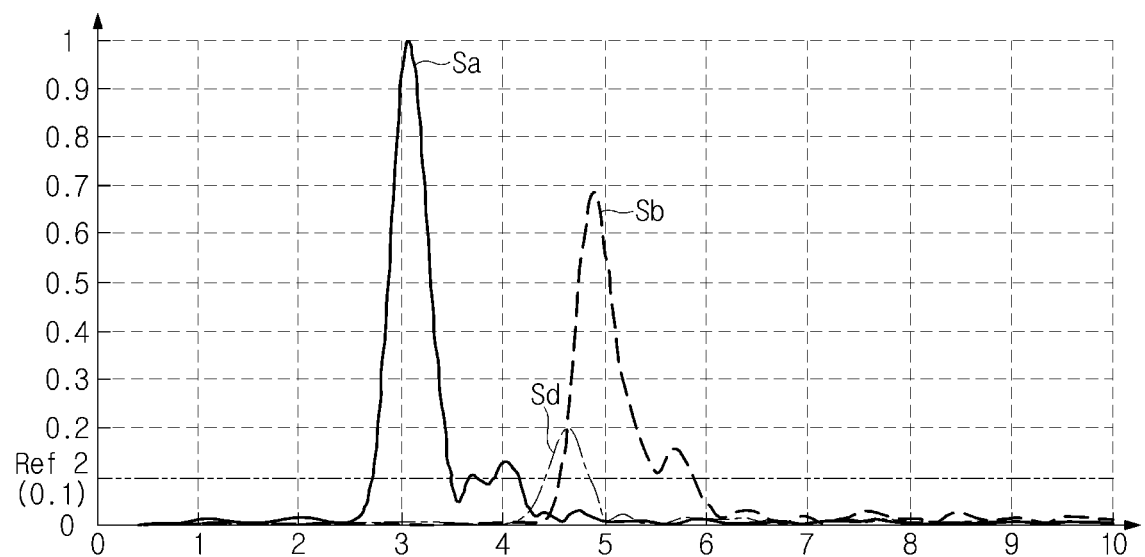

Subsequently, as shown in FIG. 6C, the vehicle controller 120 may extract the RF signals Sa, Sb, and Sd, each of which has a maximum value corresponding to the second reference value Ref2 or higher, from among RF signals Sa~Sf as the valid signals. In this case, the vehicle controller 120 may set a specific value, that is obtained when a predetermined ratio (e.g., 0.1 as shown in FIG. 6B) is multiplied by the RF signal Sa having the highest maximum value from among the plurality of RF signals Sa~Sf, to the second reference value Ref2.

In association with FIG. 6B, the above-mentioned normalization process may be omitted. In this case, the vehicle controller 120 may set a specific value, that is obtained when a predetermined ratio is multiplied by one signal having the highest maximum value from among the plurality of signals received by the plurality of vehicle antennas 111$a$~111$f$, to the second reference value Ref2, thereby extracting the valid signal.

Subsequently, the vehicle controller 120 may determine the initial arrival pulses S1$a$, S1$b$, and S1$d$ of the extracted valid signals Sa, Sb, and Sd, and may determine the position of the remote control device 200 on the basis of the arrival distance of the determined initial arrival pulses S1$a$, S1$b$, and S1$d$.

In the meantime, assuming that the number of RF signals, each of which has a signal intensity equal to or higher than the first reference value Ref1 and the second reference value Ref2, received by the plurality of vehicle antennas 111$a$~111$f$ is less than 3 (i.e., assuming that the number of RF signals each having the initial arrival pulse signal is less than 3 or the number of RF signals each having a valid signal is less than 3), the vehicle controller 120 has difficulty in recognizing the position of the remote control device 200 according to the triangulation method, such that the vehicle controller 120 may control the plurality of vehicle antennas 111$a$~111$f$ to receive signals again. The vehicle controller 120 may extract the initial arrival pulse of the valid signal on the basis of a newly received RF signal, and may determine the position of the remote control device 200 on the basis of an initial arrival pulse of the previously extracted valid signal and the arrival distance of an initial arrival pulse of the newly extracted valid signal.

However, assuming that the number of RF signals, each of which has a signal intensity equal to or higher than the first reference value Ref1 and the second reference value Ref2, received by the plurality of vehicle antennas 111$a$~111$f$ is equal to or higher than 3, the vehicle controller 120 may determine the position of the remote control device 200 on the basis of the arrival distance of an initial arrival peak value of the newly extracted valid signal, without receiving the RF signals.

A method for controlling the vehicle 100 according to the embodiment will hereinafter be described with reference to FIG. 7. FIG. 7 is a flowchart illustrating a method for controlling the vehicle according to embodiments of the present disclosure.

As shown in FIG. 7, the plurality of vehicle antennas 111$a$~111$f$ contained in the vehicle 100 may receive RF signals from the respective remote control devices 200 (Operation 1110). In this case, each RF signal may include one or more pulse signals.

Subsequently, the vehicle controller 120 may measure an arrival time of the RF signals and the signal intensity based on the arrival time, and may convert signal intensity data based on the arrival time into data of the signal intensity based on the arrival distance (Operation 1120). In this case, the vehicle controller 120 may generate signal intensity data based on the arrival distance on the basis of not only a propagation speed of the prestored RF signal but also the measured arrival distance.

Subsequently, the vehicle controller 120 may extract a pulse signal having the first reference value Ref1 or higher from among the plurality of pulse signals received by the respective vehicle antennas 111, and may extract the initial arrival pulse signal having the shortest arrival time (i.e., the shortest arrival distance) from among the plurality of pulse signals each having the first reference value Ref1 or higher (Operation 1130).

In addition, the vehicle controller 120 may collect RF signals received by the plurality of vehicle antennas 111, and may normalize other RF signals on the basis of one RF signal having the highest maximum value from among the plurality of RF signals (Operation 1140). The vehicle controller 120 may extract one RF signal having a maximum value corresponding to the second reference value Ref2 or higher from among the normalized RF signals as the valid signal (Operation 1150). In this case, the above-mentioned normalization process 1140 of the RF signal may be omitted for convenience of description.

Subsequently, the vehicle controller 120 may determine the initial arrival pulse signal of the extracted valid signal, and may determine the position of the remote control device 200 on the basis of the arrival distance of the initial arrival pulse of the valid signal (Operation 1160). For example, if the vehicle controller 120 determines the presence of three valid signals, and if each valid signal has an initial arrival pulse having a maximum value corresponding to the first reference value or higher, the vehicle controller 120 may respectively determine the arrival distances of three initial arrival pulses, and may determine the position of the remote control device 200 on the basis of the three arrival distances.

In the meantime, although the embodiment has disclosed that the vehicle controller 120 extracts the initial arrival pulse (Operation 1130) and signal intensity data based on the arrival time of the RF signal is converted into signal intensity data based on the arrival distance prior to execution of the normalization operation 1140, the process for converting the signal intensity data based on the arrival time into signal intensity data based on the arrival distance may also be carried out in the operation 1160 for determining the position of the remote control device 200 on the basis of the initial arrival pulse of the valid signal.

As is apparent from the above description, the vehicle and the method for controlling the same according to embodiments of the present disclosure can extract a pulse appropriate for estimating the position of the remote control device even when several pulses are received by the antennas of the vehicle, resulting in reduction of a measurement error of the arrival distance. The embodiments of the present disclosure can correctly measure the arrival distance even in a shadow region having many noise signals, such that the position of the remote control device can be correctly estimated.

In the embodiments described above, some components may be implemented as a "module". Here, the term "module" means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

In addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

While contents of the present disclosure have been described with respect to a limited number of embodiments, those skilled in the art, having the benefit of this disclosure, will appreciate that other embodiments can be devised which do not depart from the scope as disclosed herein. Accordingly, the scope of the present disclosure should be limited only by the claims defined herein.

What is claimed is:

1. A vehicle comprising:
    a plurality of vehicle antennas configured to receive a plurality of signals, respectively, from a remote control device; and
    a vehicle controller configured to: i) calculate an arrival distance between each of the plurality of vehicle antennas and the remote control device based on an arrival time of the plurality of signals received by the plurality of vehicle antennas, ii) extract an initial arrival pulse signal having a first reference value or higher from among at least one pulse signal contained in each of the plurality of signals, iii) extract at least one valid signal having a maximum value corresponding to a second reference value or higher from among the plurality of signals received by the plurality of vehicle antennas, wherein the at least on valid signal including an initial arrival pulse signal, iv) calculate an arrival distance of the initial arrival pulse signal contained in at least one valid signal, and v) estimate a position of the remote control device based on the arrival distance.

2. The vehicle according to claim 1, wherein the vehicle controller is further configured to normalize the plurality of signals received by the plurality of vehicle antennas based on a signal having a highest maximum value from among the plurality of signals received by the plurality of vehicle antennas.

3. The vehicle according to claim 1, wherein the second reference value equals a predetermined ratio multiplied by a signal having a highest maximum value from among the plurality of signals received by the plurality of vehicle antennas.

4. The vehicle according to claim 1, wherein the vehicle controller is further configured to normalize the at least one pulse signal based on a pulse signal having a highest maximum value from among the at least one pulse signal contained in each of the plurality of signals.

5. The vehicle according to claim 1, wherein the first reference value equals a predetermined ratio multiplied by a pulse signal having a highest maximum value from among the at least one pulse signal contained in each of the plurality of signals.

6. The vehicle according to claim 1, wherein:
    the plurality of vehicle antennas includes at least three vehicle antennas; and
    the vehicle controller is further configured to estimate the position of the remote control device using triangulation.

7. The vehicle according to claim 1, wherein the plurality of vehicle antennas receive signals from the remote control device through an Ultra Wide Band (UWB) communication network.

8. The vehicle according to claim 1, further comprising:
    a vehicle signal conversion module configured to demodulate the plurality of signals received from the remote control device and transmit the demodulated signal to the vehicle controller.

9. A method for controlling a vehicle comprising:
    receiving a plurality of signals by a plurality of vehicle antennas, respectively, from a remote control device;
    extracting, by a processor, an initial arrival pulse signal having a first reference value or higher from among at least one pulse signal contained in each of the plurality of signals;
    extracting, by the processor, at least one valid signal having a maximum value corresponding to a second reference value or higher from among the plurality of signals received by the plurality of vehicle antennas, wherein the at least on valid signal including an initial arrival pulse signal;
    calculating, by the processor, an arrival distance of the initial arrival pulse signal contained in at least one valid signal; and
    estimating, by the processor, a position of the remote control device based on the arrival distance.

10. The method according to claim 9, wherein the extracting of the at least one valid signal comprises:
- normalizing, by the processor, the plurality of signals received by the plurality of vehicle antennas based on a signal having a highest maximum value from among the plurality of signals received by the plurality of vehicle antennas; and
- extracting, by the processor, the at least one valid signal having the maximum value corresponding to the second reference value or higher from among the normalized signals.

11. The method according to claim 9, wherein the second reference value equals a predetermined ratio multiplied by a signal having a highest maximum value from among the plurality of signals received by the plurality of vehicle antennas.

12. The method according to claim 9, wherein the extracting of the at least one valid signal comprises:
- normalizing, by the processor, the at least one pulse signal based on a pulse signal having a highest maximum value from among the at least one pulse signal contained in each of the plurality of signals; and
- extracting, by the processor, the initial arrival pulse signal having the first reference value or higher from among the at least one normalized pulse signal.

13. The method according to claim 9, wherein the first reference value equals a predetermined ratio multiplied by a pulse signal having a highest maximum value from among the at least one pulse signal contained in each of the plurality of signals.

14. The method according to claim 9, further comprising:
- before the extracting of the at least one valid signal, calculating, by the processor, an arrival distance from the remote control device to each of the plurality of vehicle antennas based on an arrival time of the plurality of signals received by the plurality of vehicle antennas.

15. The method according to claim 9, wherein the calculating of the arrival distance comprises:
- calculating, by the processor, an arrival distance based on an arrival time of an initial arrival peak value of the at least one valid signal.

16. The method according to claim 9, wherein the receiving of the plurality of signals comprises:
- receiving, by the processor, a signal from the remote control device through an Ultra Wide Band (UWB) communication network.

17. The method according to claim 9, further comprising:
- before the extracting of the at least one valid signal, demodulating, by the processor, the plurality of signals received from the remote control device.

* * * * *